United States Patent
Bu et al.

(10) Patent No.: US 10,491,896 B2
(45) Date of Patent: Nov. 26, 2019

(54) METHOD OF FIXED-RATE LINE-BASED EMBEDDED VIDEO COMPRESSION AND IMAGE PROCESSING APPARATUS USING THE SAME

(71) Applicant: Novatek Microelectronics Corp., Hsinchu (TW)

(72) Inventors: Xiaoming Bu, Xi'an (CN); Jian-Wen Chen, Hsinchu (TW); Po-Chin Hu, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 309 days.

(21) Appl. No.: 15/432,938

(22) Filed: Feb. 15, 2017

(65) Prior Publication Data
US 2018/0213228 A1    Jul. 26, 2018

(30) Foreign Application Priority Data
Jan. 25, 2017    (CN) .......................... 2017 1 0061166

(51) Int. Cl.
*H04N 7/12*    (2006.01)
*H04N 11/02*    (2006.01)
(Continued)

(52) U.S. Cl.
CPC ......... *H04N 19/124* (2014.11); *H04N 11/046* (2013.01); *H04N 19/15* (2014.11); *H04N 19/182* (2014.11)

(58) Field of Classification Search
None
See application file for complete search history.

(56) References Cited

U.S. PATENT DOCUMENTS

| 7,986,731 B2 * | 7/2011 | Haskell | H04N 19/172 375/240.03 |
| 2014/0247983 A1 * | 9/2014 | MacInnis | H04N 19/14 382/166 |

(Continued)

OTHER PUBLICATIONS

Wu et al., "CALIC—a context based adaptive lossless image codec," Proceedings of IEEE International Conference on Acoustics, Speech, and Signal Processing (ICASSP-96), May 9, 1996, pp. 1-5.
(Continued)

*Primary Examiner* — Chikaodili E Anyikire
(74) *Attorney, Agent, or Firm* — JCIPRNET

(57) ABSTRACT

The disclosure proposes a method of fixed-rate line-based embedded video compression and an image processing apparatus using the same method. The method includes at least the following steps. A current encoding frame is received. Pixels in a current encoding frame are grouped on a line-by-line basis, and the grouped pixels are packed into pixel segments. Complexity information of a current pixel segment is calculated according to the pixels therein and neighboring pixels thereof. The current pixel segment is respectively encoded in a differential pulse-coding modulation (DPCM) mode and a truncation mode to generate a DPCM bitstream and a truncated bitstream according to a quantization parameter (QP). Either the DPCM bitstream or the truncated bitstream is selected and outputted according to the complexity information. An amount of bits used by the current pixel segment is feedback to calculate a new QP corresponding to a next pixel segment to be processed.

22 Claims, 5 Drawing Sheets

(51) Int. Cl.
*H04N 11/04* (2006.01)
*H04N 19/124* (2014.01)
*H04N 19/182* (2014.01)
*H04N 19/15* (2014.01)

(56) References Cited

U.S. PATENT DOCUMENTS

2014/0294089 A1* 10/2014 MacInnis ............... H04N 19/63
 375/240.19
2015/0365703 A1* 12/2015 Puri ..................... H04N 19/176
 375/240.24

OTHER PUBLICATIONS

International Telecommunication Union, "Series T: Terminals for Telematic Services: Information technology—Lossless and near-lossless compression of continuous-tone still images—Baseline," ISO/IEC International Standard 14495-1, Dec. 1999, pp. 1-75.

* cited by examiner

METHOD OF FIXED-RATE LINE-BASED EMBEDDED VIDEO COMPRESSION AND IMAGE PROCESSING APPARATUS USING THE SAME

CROSS-REFERENCE TO RELATED APPLICATION

This application claims the priority benefit of China application serial no. 201710061166.8, filed on Jan. 25, 2017. The entirety of the above-mentioned patent application is hereby incorporated by reference herein and made a part of this specification.

TECHNICAL FIELD

The disclosure relates to a method of fixed-rate line-based embedded video compression and an image processing apparatus using the same method.

BACKGROUND

With rapidly advancing computer, network, and digital imaging technologies, there is an astronomical amount of video data for a wide range of applications, especially in digital playback devices such as digital video recorders, high-definition televisions, home theater computers, video conferencing devices, smart phones, and so forth. Tremendous memory bandwidth and processing power are required to store and transmit massive video contents. Despite many embedded compression methods and systems have been developed to reduce such burden, there is no guarantee of constant bit rate under visual lossless performance.

SUMMARY OF THE DISCLOSURE

Accordingly, the disclosure is directed to a method of fixed-rate line-based embedded video compression and an image processing apparatus using the same method.

According to one of the exemplary embodiments, the disclosure proposes a method of fixed-rate line-based embedded video compression. The method includes at least the following steps. First, a current encoding frame is received. Pixels in the current encoding frame are grouped on a line-by-line basis, and the grouped pixels are packed into pixel segments including a current pixel segment. Complexity information of the current pixel segment is calculated according to the pixels therein and neighboring pixels thereof. The current pixel segment is respectively encoded in a differential pulse-coding modulation (DPCM) mode and a truncation mode to generate a DPCM bitstream and a truncated bitstream according to a quantization parameter (QP). Either the DPCM bitstream or the truncated bitstream is selected and outputted according to the complexity information. An amount of used bits utilized by the current pixel segment is feedback to calculate a new QP corresponding to a next pixel segment of the pixel segments.

In one of the exemplary embodiments, the disclosure is directed to an image processing apparatus which includes but not limited to a storage medium and a processor coupled to the storage medium. The processor is at least configured to receive a current encoding frame among a sequence of incoming frames, to group pixels in the current encoding frame on a line-by-line basis and pack the grouped pixels into pixel segments including a current pixel segment, to encode the current pixel segment respectively in a DPCM mode and a truncation mode to generate a DPCM bitstream and a truncated bitstream according to a QP, to select and output either the DPCM bitstream or the truncated bitstream according to the complexity information, and feedback an amount of used bits utilized by the current pixel segment to calculate a new QP corresponding to a next pixel segment of the pixel segments.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

Figure 1A:
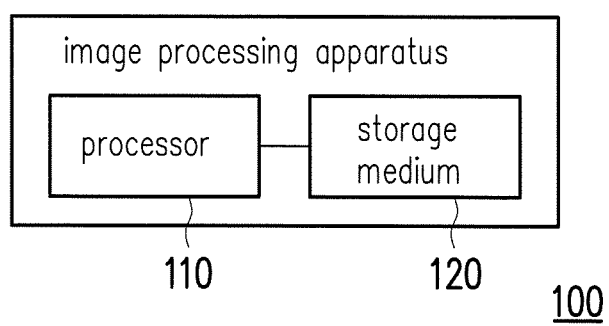
FIG. 1A illustrates an exemplary image processing apparatus which utilizes the proposed method of fixed-rate line-based embedded video compression from the hardware perspective in accordance with one of the exemplary embodiments of the disclosure.

To make the above features and advantages of the application more comprehensible, several embodiments accompanied with drawings are described in detail as follows.

DESCRIPTION OF THE EMBODIMENTS

Some embodiments of the disclosure will now be described more fully hereinafter with reference to the accompanying drawings, in which some, but not all embodiments of the application are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

FIG. 1A illustrates an exemplary image processing apparatus which utilizes the proposed method of fixed-rate line-based embedded video compression from the hardware perspective in accordance with one of the exemplary embodiments of the disclosure.

Figure 1B:
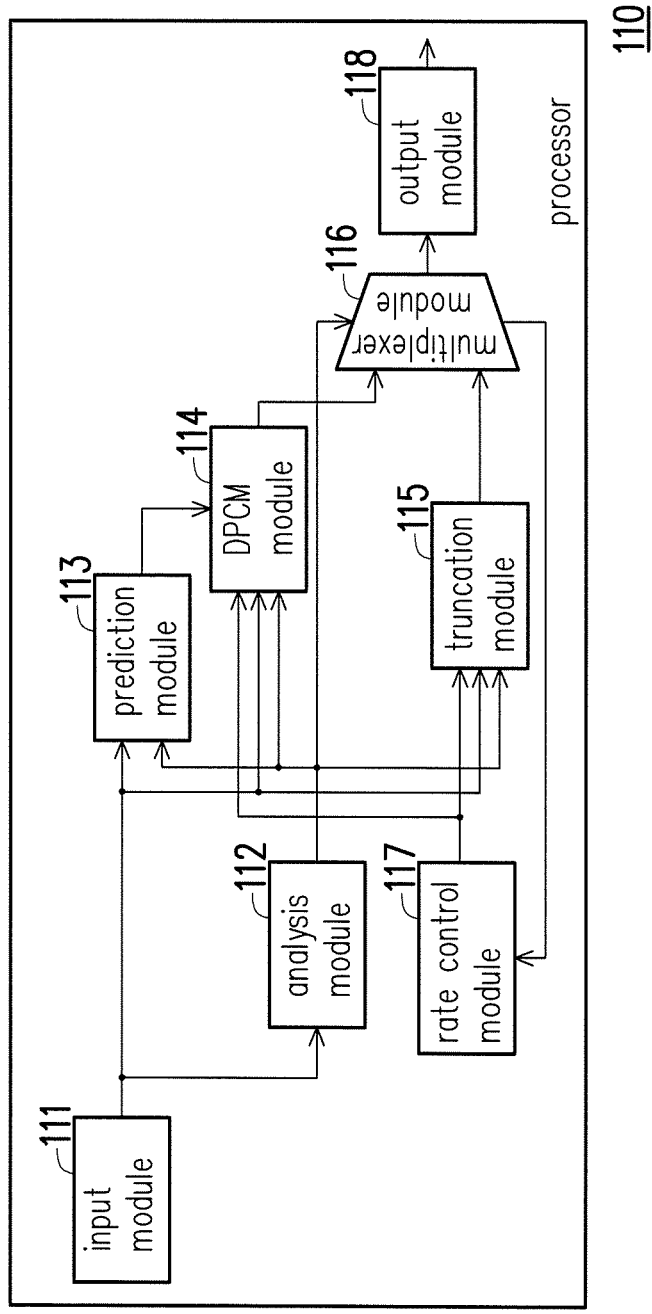
FIG. 1B illustrates the processor of the image processing apparatus in further detail in accordance with one of the exemplary embodiments of the disclosure.

Referring to FIG. 1A and FIG. 1B, an exemplary image processing apparatus 100 would include but not limited to a processor 110 and a storage medium 120. The image processing apparatus 100 may be an electronic device such as a personal computer, a laptop computer, a tabular computer, a digital camera, a digital camcorder, a smart phone, an event data recorder, a vehicle audio and video system, and so forth.

The processor 110 would be configured to implement functional elements of the proposed method of fixed-rate line-based embedded video compression as well as exemplary embodiments in the subsequent disclosures. The functions of the processor 110 may be implemented by using one or multiple programmable units such as a field programmable array (FPGA), a programmable logic device (PLD), an application specific integrated circuit (ASIC), a central processing unit (CPU), a programmable general purpose or special purpose microprocessor, microcontroller, a digital signal processor (DSP), a programmable logic device (PLD), other similar devices or circuits, or a combination thereof. The functions of the processor 110 may also be implemented with separate electronic devices or integrated circuits (ICs), and functions of the processor 110 may also be implemented with hardware or software or a combination of both.

The storage medium 120 would be coupled to the processor 110 to store programming codes, device configurations, look up tables, buffered or permanent data, and so forth. The storage medium 120 could be volatile or permanent memories such as a stationary or mobile random access memory (RAM), a read-only memory (ROM), a flash memory, a hard drive, or other similar devices or circuits.

The image processing apparatus 100 may optionally include an image capturing device, an interface, an image displaying device, and a communication unit. The image capturing device could be a camera or a camcorder which captures video or motion images. The interface could be an input/output interface which allows the image processing apparatus 100 to receive image data and output processed image data. The image displaying device could be any display for displaying processed image data. The communication unit could be a modem or a wireless transceiver used to obtain image data from external sources by going through a wireless connection or a cable connection. In some instances, the communication unit could also transmit the processed image data to other devices or platforms.

FIG. 1B illustrates the processor 110 of the image processing apparatus 100 in further detail in accordance with one of the exemplary embodiments of the disclosure.

Referring to FIG. 1B, the processor 110 could be considered as an encoder in the image processing apparatus 100 and may include but not limited to an input module 111, an analysis module 112, a prediction module 113, a DPCM module 114, a truncation module 115, a multiplexer module 116, a rate control module 117, and an output module 118. These modules 111~118 could be implemented as hardware modules such as separate hardware ICs, software modules, or a combination of both hardware and software modules. The details of FIG. 1A and FIG. 1B are further elucidated in subsequent disclosures.

Figure 2:
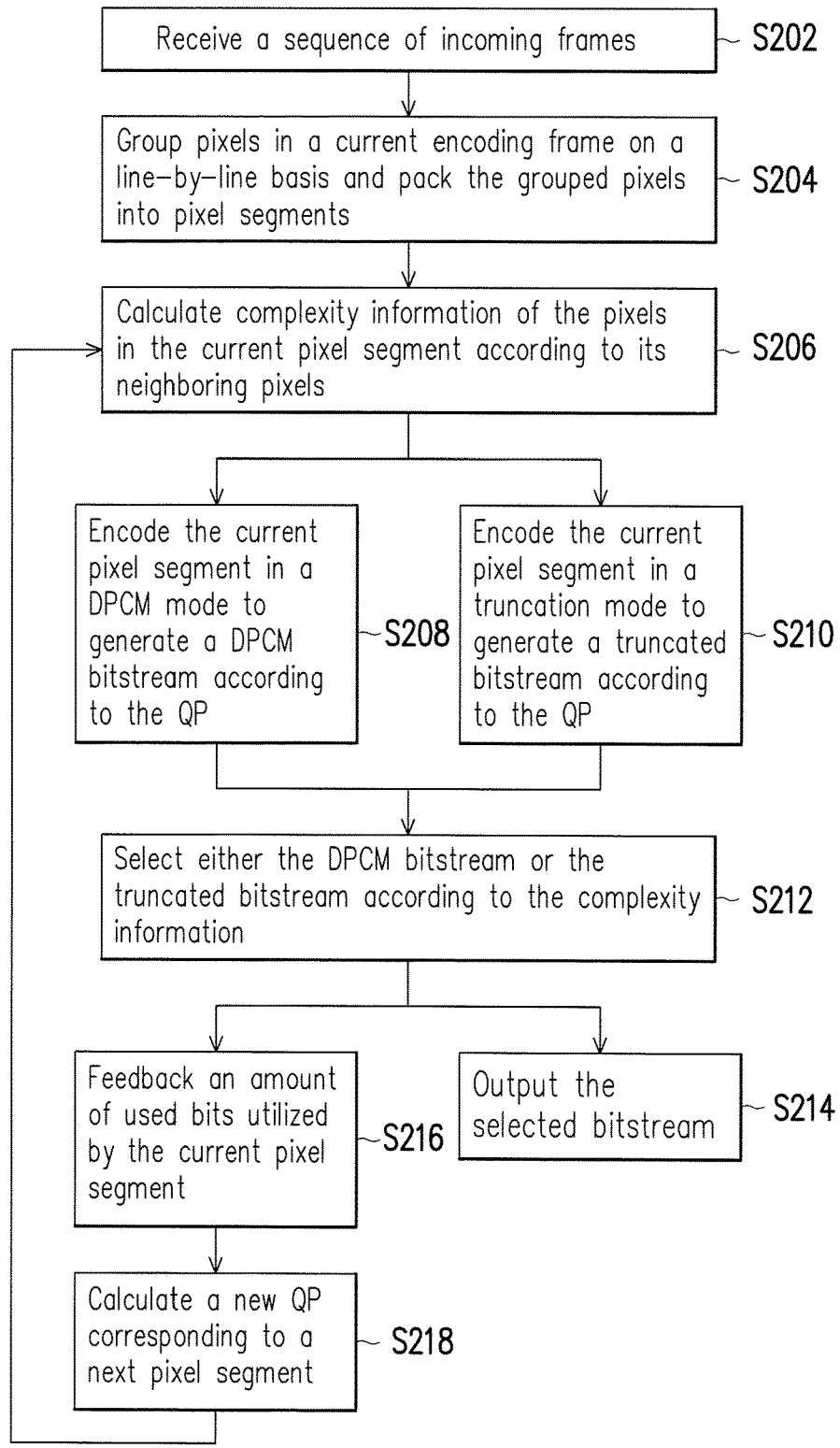
FIG. 2 illustrates a flowchart of a method of fixed-rate line-based embedded video compression in accordance with one of the exemplary embodiments of the disclosure.

FIG. 2 illustrates a flowchart of a method of fixed-rate line-based embedded video compression in accordance with one of the exemplary embodiments of the disclosure. The steps of FIG. 2 could be implemented by the proposed image capturing apparatus 100 as illustrated in FIG. 1A and FIG. 1B.

Referring to FIG. 2 along with FIG. 1A and FIG. 1B, the input module 111 of the processor 110 would receive a sequence of incoming frames (Step S202). In other words, an input of a raw video frame sequence would be received by the input module 111. The proposed method could be built in any color space such as RGB. YUV, $YC_bC_r$ compatible in most digital video applications. The color element of each pixel in the incoming frames uses three color channel values together to represent the intensity and the color. For simplicity purposes, only one of the incoming frames (referred to as a "current encoding frame") would be illustrated, and the other incoming frames could be deduced in a similar fashion.

The input module 111 would further group pixels in the current encoding frame on a line-by-line basis and pack the grouped pixels into pixel segments (Step S204). As a preprocessing step, the pixels in the current encoding frame would be grouped by lines, either row-wisely or column-wisely, and packed by segments as the input of the proposed method. Each segment could consist of, for example, 64 pixels and would be used as a basic unit for analysis. For simplicity purposes, only one of the pixel segments (referred to as a "current pixel segment") would be illustrated, and the other pixel segments could be deduced in a similar fashion.

Figure 3:
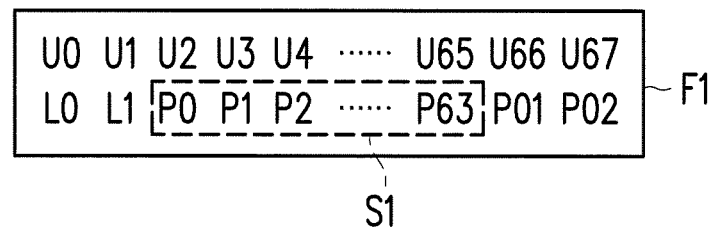
FIG. 3 illustrates a schematic diagram of a current pixel segment along with its neighboring pixels in accordance with one of the exemplary embodiments of the disclosure.

As an example, FIG. 3 illustrates a current pixel segment along with its neighboring pixels in accordance with one of the exemplary embodiments of the disclosure. Referring to FIG. 3, a pixel segment S1 in a frame F1 includes 64 pixels P0~P63 and is considered as the current pixel segment to be processed. Pixels U0~U67 are pixels above the pixel segment S1 within the same frame F1 and could have been encoded and reconstructed, and pixels L0~L1 and pixels R0~R1 are pixels respectively on the left and right of the pixel segment S1.

Referring back to FIG. 2, the analysis module 112 would next calculate complexity information of the pixels in the current pixel segment according to its neighboring pixels (Step S206). The complexity information could be a degree of pixel variation in the current pixel segment. In an exemplary embodiment, the complexity could be individually examined in each local neighborhood, and the overall complexity could represent the complexity information of the current pixel segment.

In detail, the analysis module 112 could first designate the pixels in the current pixel segment to multiple local regions. Each of the local regions would be in a size of, for example 2×2 pixels, and therefore would consist of a part of the pixels in the current pixel segment and at least one of the neighboring pixels of the current pixel segment. As an example in FIG. 3, the pixels P0, P1, U2, and U3 could form a local region. The analysis module 112 would next calculate a variance of the pixels in each of the local regions to determine a corresponding local complexity. When the variance of the pixels within a local region is greater than a variance threshold, a local complexity of such region is classified into "complex". When the variance of the pixels within a local region is not greater than the variance threshold, a local complexity of such region is classified into "homogeneous". The analysis module 122 would evaluate the complexity information of the current pixel segment according to the local complexity of each local region by, for example, total counts of homogenous local regions and complex local regions. When the number of complex local regions is more than that of homogenous local regions, the complexity information of the current pixel segment would be evaluated as "complex". When the number of complex local regions is less than that of homogenous local regions, the complexity information of the current pixel segment would be evaluated as "homogenous". However, the disclosure is not limited in this regard.

In terms of the video coding process, an intra-frame DPCM coding mode which explores spatial redundancy among neighboring pixels by various prediction methods would be provided as one of the coding approaches. Such approach offers advantages of computational simplicity and minimal loss of perceived image quality, and yet bit-budget would not be securely guaranteed. On the other hand, a truncation coding mode truncates certain pixels in a statistical fashion. Such approach ensures bit-budget constraints, and yet visual quality would be possibly sacrificed at higher compression ratios. Hence, an adaptive compression mode selection process would be performed based on the complexity information of the current pixel segment to maintain video quality at the visually lossless level under bit-budget constraints. It should be noted that, the video coding process is highly dependent on a quantization parameter (QP), which regulates how much spatial detail to be preserved. When the value of the quantization parameter is small, most spatial detail is retained. As the value of the quantization parameter increases, some detail is aggregated so that the bit rate drops, but at the expense of some increase in distortion and some loss in quality.

In detail, the DPCM module 114 would encode the current pixel segment in a DPCM mode to generate a DPCM bitstream according to a QP corresponding to the current pixel segment (Step S208). This step involves motion estimation and entropy coding as respectively illustrated in FIG. 4 and FIG. 5. It should first be noted that, the QP could be different in the two modes. More details would be described later on.

Figure 4:
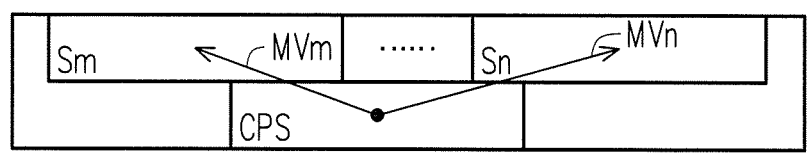
FIG. 4 illustrates a schematic diagram of motion estimation in accordance with one of the exemplary embodiments of the disclosure.

Referring to FIG. 4 in conjunction with FIG. 1A and FIG. 1B, the prediction module 113 would first perform spatial prediction motion estimation on a current pixel segment CPS. In the present exemplary embodiment, the prediction module 113 would compute a best matching motion vector according to a maximum likelihood principle. First, the sum of absolute differences SAD[m]~SAD[n] between the pixels in the current pixel segment CPS and each candidate pixel segment Sm~Sn would be calculated, and MVm~MVn denote candidate motion vectors. The candidate pixel segments could be the pixel segments immediately adjacent or neighboring to the current pixel segment, where the number of the candidate pixel segments could be preset. Next, the motion vector with the minimum SAD value would be the best matching motion vector.

Figure 5:
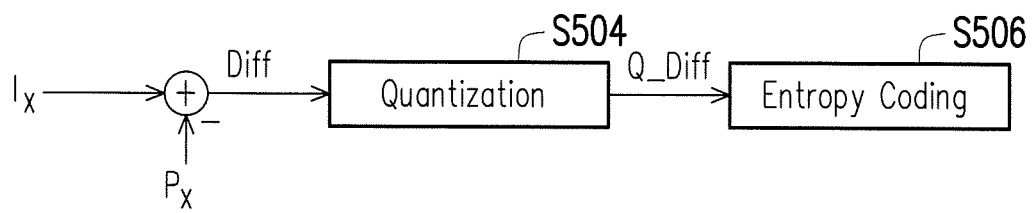
FIG. 5 illustrates a schematic diagram of entropy coding in accordance with one of the exemplary embodiments of the disclosure.

Referring to FIG. 5 in conjunction with FIG. 1A and FIG. 1B, the DPCM module 114 would perform entropy coding based upon the best matching motion vector obtained from the prediction module 113 and the quantization parameter. For each pixel Ix in the current pixel segment, its corresponding predicted pixel Px would be calculated according to the best matching motion vector. The residual (i.e. the difference) between each pixel Ix and its corresponding predicted pixel Px would be calculated (Step S502). All the differences Diff would be quantized to quantized differences Q_Diff by the QP (Step S504). The quantized differences Q_Diff would be compressed by entropy coding (Step S506) to generate the DPCM bitstream.

Revisiting FIG. 2, as an alternative coding approach, the truncation module 115 would also encode the current pixel segment in a truncation mode to generate a truncated bitstream according to the QP corresponding to the current pixel segment (Step S210). In this coding approach, the truncation module 115 would drop some pixels in the current pixel segment with least significant bits based on certain rounding rules to generate the truncated bitstream.

The multiplexer module 116 would select either the DPCM bitstream or the truncated bitstream according to the complexity information (Step S212), and the output module 118 would output the selected bitstream (Step S214). The multiplexer module 116 would ensure that the bit-budget per line in the current incoming frame is fixed. The suitable bit-budget is allocated to each pixel segment according to its complexity information generated in Step S206. Given the same QP, the DPCM coding mode provides minimal loss of perceived image quality while the bit-budget would be relatively insecure as compared to the truncation coding mode. The incoming frame would be compressed by not only removing redundant information from the output bitstream but would also make small quality compromises in ways that are intended to be minimally perceptible. As human eyes are less sensitive to high-frequency changes, the multiplexer module 116 would select the truncated bitstream when the complexity information indicates that the current pixel segment is complex. On the other hand, the multiplex module 116 would select the DPCM bitstream when the complexity information indicates that the current pixel segment is homogenous. The output module 117 could output the selected bitstream to an encoding buffer in the storage medium 102 ready to be transmitted and decoded.

Once the encoding process is done for the current pixel segment, the multiplexer module 116 would feedback an amount of used bits utilized by the current pixel segment to the rate control module 117 (Step S216), and the rate control module 117 would calculate a new QP corresponding to a next pixel segment of the pixel segments (Step S218). The rate control module 117 is configured to control the quantization parameter for each pixel segment. As previously elucidated, there are two main considerations of the QP. The first one is to govern consumed bits not exceeding the given bit-budget per line. The second one is to maintain video quality at the visually lossless level. The rate control process in Step S216 and Step S218 would consist of three parts: global bit allocation, local bit adjustment, and local quantization parameter calculation.

Figure 6A:
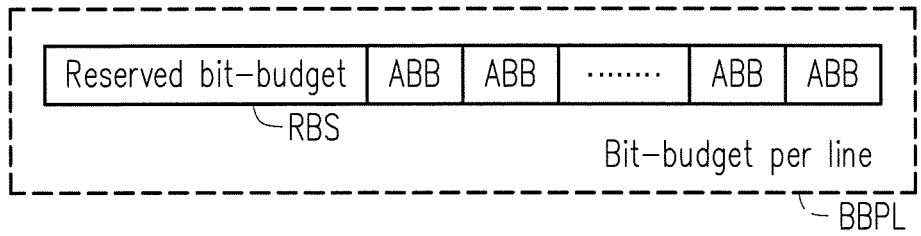
FIG. 6A illustrates a schematic diagram of global bit allocation in accordance with one of the exemplary embodiments of the disclosure.
Figure 6B:
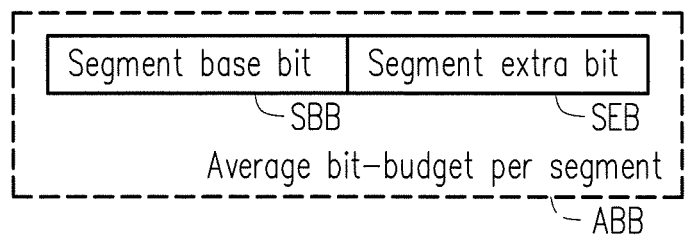
FIG. 6B illustrates a schematic diagram of local bit adjustment in accordance with one of the exemplary embodiments of the disclosure.
Figure 6C:
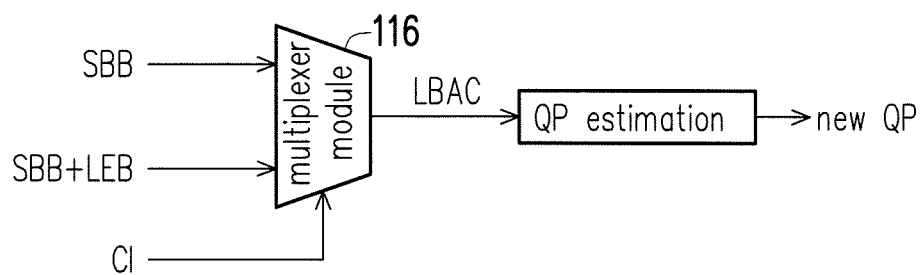
FIG. 6C illustrates a schematic diagram of local quantization parameter calculation in accordance with one of the exemplary embodiments of the disclosure.

In detail, FIG. 6A, FIG. 6B, and FIG. 6C respectively illustrate schematic diagrams of global bit allocation, local bit adjustment, and local quantization parameter calculation in accordance with one of the exemplary embodiments of the disclosure.

Referring to FIG. 6A in conjunction with FIG. 1A and FIG. 1B, in terms of global bit allocation on a line basis, before each line is processed, for a given bit-budget per line BBPL, the rate control module 117 would preserve a reserved bit-budget RBS which is used for protecting some special pattern determined based on the complexity information. The reserved bit-budget RBS could be preset by default or user setting. The control module 117 would allocate an average bit-budget ABB to each pixel segment by splitting the remaining bit-budget. For example, assume that the line in which the current pixel segment is located is referred to as "a current line". The bit-budget initially allocated to the current pixel segment could be by the following expression:

$$\text{initial bit budget} = \frac{\text{(given bit budget for the current line} - \text{reserved bit budget for the current line)}}{\text{number of pixel segments in the current line}}$$

Referring to FIG. 6B in conjunction with FIG. 1A and FIG. 1B, in terms of local bit adjustment, the multiplexer module 116 would adaptively adjust the calculated bit-budget by referencing the complexity information of each pixel segment obtained from the analysis module 112. In the present embodiment, the average bit-budget ABB would be further divided into a segment base bit SBB and a segment extra bit SEB. Pixel segments with different complexities may need different bit-budget allocation for consistent video quality. A bit-budget allocated to the pixel segment being homogeneous is greater than that allocated to the pixel segment being complex. In the present exemplary embodiment, when the complexity information indicates that the current pixel segment is complex, the bit-budget for the current pixel segment would be adjusted to only the segment base bit SBB. On the other hand, when the complexity information indicates that the current pixel segment is homogenous, the bit-budget for the current pixel segment would be the segment base bit SBB and the segment extra bit SEB (i.e. the initially-allocated average bit-budget) for a visual lossless perspective quality. It should be noted that, when the segment extra bit SEB is not sufficient for the current pixel segment, the multiplexer module 116 would also pull an extra expense from the reserved bit-budget. When the segment extra bit SEB is not completely utilized for the current pixel segment, the multiplexer module 116 would also accumulate any left over, unused bit to the reserved bit-budget. Hence, the multiplexer module 116 would further report the local bit adjustment conclusion as a feedback result to the rate control module 117 so as to update the reserved bit-budget for calculating the new QP for the next pixel segment to be processed.

That is, referring to FIG. 6C, in terms of local quantization parameter calculation, the multiplexer module 116 would either obtain information of the segment base bit SBB from the truncation module 115 or the segment base bit SBB along with a line extra bit LEB (i.e. the currently-updated reserved bit-budget) from the DPCM module 114 as the local bit adjustment conclusion LBAC according to the complexity information CI of the current pixel segment from the analysis module 112, and the rate control module 117 would calculate the new QP accordingly in a QP estimation procedure to generate a new Qp for the DPCM module 114 and the truncation module 115, where the derivation of the new QP could be based on any existing algorithms known by the person skilled in the art.

The DPCM module 114 would further amend the new QP on a local basis in the next pixel segment to be processed in order to keep the perspective quality of the whole image equal and balance. In other words, in terms of the next processed pixel segment, the DPCM module 114 would adjust the new QP so that the bits used by the next pixel segment would be under its bit-budget constraint. On the other hand, the truncation module 115 would alter the new QP to make full use of the allocated segment bit-budget pixel by pixel. From another perspective, revisiting FIG. 2, in Step S208 and Step S210, the QP herein is obtained from the previous pixel segment that has been processed in the previous iteration. In Step S208 and Step 210, the DPCM module 114 and the truncation module 115 would also locally amend the QP in a similar fashion.

In view of the aforementioned descriptions, the disclosure provides a fixed-rate line-based embedded video compression technique to adaptively encoding each pixel segment based on its complexity, which maintain video quality at visually lossless levels under certain bit-budget constraints.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A method of fixed-rate line-based embedded video compression applicable to an image processing apparatus, wherein the method comprises the following steps:
   receiving a current encoding frame among a sequence of incoming frames;
   grouping a plurality of pixels in the current encoding frame on a line-by-line basis and packing the grouped pixels into a plurality of pixel segments comprising a current pixel segment;
   calculating complexity information of the current pixel segment according to the pixels therein and a plurality of neighboring pixels thereof;
   encoding the current pixel segment respectively in a differential pulse-coding modulation (DPCM) mode and a truncation mode to generate a DPCM bitstream and a truncated bitstream according to a quantization parameter (QP);
   selecting and outputting either the DPCM bitstream or the truncated bitstream according to the complexity information; and
   feedbacking an amount of bits used by the current pixel segment to calculate a new QP corresponding to a next pixel segment of the pixel segments.

2. The method according to claim 1, wherein the step of calculating the complexity information of the current pixel segment according to the pixels therein and the neighboring pixels thereof comprises:

designating the pixels in the current pixel segment to a plurality of local regions, wherein each of the local regions consists of a part of the pixels and at least one of the neighboring pixels;

calculating a variance of the pixels in each of the local regions and accordingly determining a local complexity of each of the local regions, wherein the local complexity is complex when the corresponding variance is greater than a variance threshold, and wherein the local complexity is homogeneous when the corresponding variance is not greater than the variance threshold; and determining the complexity information of the current pixel segment according to the local complexity of each of the local regions, wherein the complexity information is complex when the number of the local regions being complex is greater than that of the local regions being homogeneous, and wherein the complexity information is homogeneous when the number of the local regions being complex is not greater than that of the local regions being homogeneous.

3. The method according to claim 1, wherein the step of encoding the current pixel segment in the DPCM mode to generate the DPCM bitstream according to the quantization parameter comprises:

performing motion estimation on the current pixel segment to generate a selected motion vector among a plurality of candidate motion vectors;

obtaining a plurality of predicted pixels respectively corresponding to each pixel in the current pixel segment according to the selected motion vector;

calculating a difference between each of the predicted pixels and the corresponding pixel thereof in the current pixel segment;

quantizing the differences to obtain a plurality of quantized differences according to the QP; and compressing the quantized differences by entropy coding to generate the DPCM bitstream.

4. The method according to claim 1, wherein the step of encoding the current pixel segment in the truncation mode to generate the truncated bitstream according to the quantization parameter comprises:

truncating a part of the pixels in the current pixel segment with least significant bits according to the quantization parameter to generate the truncated bitstream.

5. The method according to claim 2, wherein the step of selecting either the DPCM bitstream or the truncated bitstream according to the complexity information comprises:

selecting the DPCM bitstream when the complexity information is homogeneous; and selecting the truncated bitstream when the complexity information is complex.

6. The method according to claim 1, wherein after the step of grouping the pixels in the current encoding frame on the line-by-line basis, the method further comprises:

obtaining a given bit-budget of a current line including the current pixel segment;

setting a reserved bit-budget of the current line;

splitting a difference of the given bit-budget and the reserved bit-budget for each of the pixel segments in the current line to obtain an average bit-budget per pixel segment; and allocating the average bit-budget to the current pixel segment as a bit-budget thereof.

7. The method according to claim 6, wherein the average bit-budget comprises segment base bits and segment extra bits, and wherein the method further comprises:

when the current pixel segment is encoded in the DPCM mode, either setting the average bit-budget as the bit-budget of the current pixel segment or adjusting the bit-budget of the current pixel segment by adding potential bits obtained from the reserved bit-budget thereto; and when the current pixel segment is encoded in the truncated mode, adjusting the bit-budget of the current pixel segment by subtracting the segment extra bits therefrom.

8. The method according to claim 7, the step of feedbacking the amount of used bits utilized by the current pixel segment to calculate the new QP corresponding to the next pixel segment of the pixel segments comprises:

generating a feedback result comprising the adjusted bit-budget;

updating the reserved bit-budget according to the feedback result; and performing QP estimation according to the feedback result to generate the new QP.

9. The method according to claim 1, wherein before the step of encoding the current pixel segment respectively in the DPCM mode and the truncation mode to generate the DPCM bitstream and the truncated bitstream according to a QP, the method further comprises:

adjusting the QP in the DPCM mode and the truncated mode respectively according to a bit-budget allocated for the current pixel segment.

10. The method according to claim 1, wherein a bit-budget allocated to each line in the current encoding frame is fixed.

11. The method according to claim 1, wherein a bit-budget allocated to the current pixel segment being homogeneous is greater than that allocated to the current pixel segment being complex.

12. An image processing apparatus comprising:

a storage medium; and a processor coupled to the storage medium, wherein the processor is configured at least for:

receiving a current encoding frame among a sequence of incoming frames;

grouping a plurality of pixels in the current encoding frame on a line-by-line basis and packing the grouped pixels into a plurality of pixel segments comprising a current pixel segment;

calculating complexity information of the current pixel segment according to the pixels therein and a plurality of neighboring pixels thereof;

encoding the current pixel segment respectively in a differential pulse-coding modulation (DPCM) mode and a truncation mode to generate a DPCM bitstream and a truncated bitstream according to a quantization parameter (QP);

selecting and outputting either the DPCM bitstream or the truncated bitstream according to the complexity information; and feedbacking an amount of bits used by the current pixel segment to calculate a new QP corresponding to a next pixel segment of the pixel segments.

13. The image processing apparatus according to claim 12, wherein the processor is configured for calculating the complexity information of the current pixel segment according to the pixels therein and the neighboring pixels thereof comprising:
    designating the pixels in the current pixel segment to a plurality of local regions, wherein each of the local regions consists of a part of the pixels and at least one of the neighboring pixels;
    calculating a variance of the pixels in each of the local regions and accordingly determining a local complexity of each of the local regions, wherein the local complexity is complex when the corresponding variance is greater than a variance threshold, and wherein the local complexity is homogeneous when the corresponding variance is not greater than the variance threshold; and
    determining the complexity information of the current pixel segment according to the local complexity of each of the local regions, wherein the complexity information is complex when the number of the local regions being complex is greater than that of the local regions being homogeneous, and wherein the complexity information is homogeneous when the number of the local regions being complex is not greater than that of the local regions being homogeneous.

14. The image processing apparatus according to claim 12, wherein the processor is configured for encoding the current pixel segment in the DPCM mode to generate the DPCM bitstream according to the quantization parameter comprising:
    performing motion estimation on the current pixel segment to generate a selected motion vector among a plurality of candidate motion vectors;
    obtaining a plurality of predicted pixels respectively corresponding to each pixel in the current pixel segment according to the selected motion vector;
    calculating a difference between each of the predicted pixels and the corresponding pixel thereof in the current pixel segment;
    quantizing the differences to obtain a plurality of quantized differences according to the QP; and
    compressing the quantized differences by entropy coding to generate the DPCM bitstream.

15. The image processing apparatus according to claim 12, wherein the processor is configured for encoding the current pixel segment in the truncation mode to generate the truncated bitstream according to the quantization parameter comprising:
    truncating a part of the pixels in the current pixel segment with least significant bits according to the quantization parameter to generate the truncated bitstream.

16. The image processing apparatus according to claim 13, wherein the processor is configured for selecting either the DPCM bitstream or the truncated bitstream according to the complexity information comprising:
    selecting the DPCM bitstream when the complexity information is homogeneous; and
    selecting the truncated bitstream when the complexity information is complex.

17. The image processing apparatus according to claim 16, wherein the processor is further configured for:
    obtaining a given bit-budget of a current line including the current pixel segment;
    setting a reserved bit-budget of the current line;
    splitting a difference of the given bit-budget and the reserved bit-budget for each of the pixel segments in the current line to obtain an average bit-budget per pixel segment; and
    allocating the average bit-budget to the current pixel segment as a bit-budget thereof.

18. The image processing apparatus according to claim 17, wherein the average bit-budget comprises segment base bits and segment extra bits, and wherein the processor is further configured for:
    when the current pixel segment is encoded in the DPCM mode, either setting the average bit-budget as the bit-budget of the current pixel segment or adjusting the bit-budget of the current pixel segment by adding potential bits obtained from the reserved bit-budget thereto; and
    when the current pixel segment is encoded in the truncated mode, adjusting the bit-budget of the current pixel segment by subtracting the segment extra bits therefrom.

19. The image processing apparatus according to claim 18, wherein the processor is configured for feedbacking the amount of used bits utilized by the current pixel segment to calculate the new QP corresponding to the next pixel segment of the pixel segments comprising:
    generating a feedback result comprising the adjusted bit-budget;
    updating the reserved bit-budget according to the feedback result; and
    performing QP estimation according to the feedback result to generate the new QP.

20. The image processing apparatus according to claim 12, wherein the processor is further configured for adjusting the QP in the DPCM mode and the truncated mode respectively according to a bit-budget allocated for the current pixel segment.

21. The image processing apparatus according to claim 12, wherein a bit-budget allocated to each line in the current encoding frame is fixed.

22. The image processing apparatus according to claim 12, wherein a bit-budget allocated to the current pixel segment being homogeneous is greater than that allocated to the current pixel segment being complex.

* * * * *